US009311888B2

(12) United States Patent
Takahashi et al.

(10) Patent No.: US 9,311,888 B2
(45) Date of Patent: Apr. 12, 2016

(54) IMAGE PROCESSING DEVICE, IMAGE PROCESSING METHOD AND PROGRAM

(71) Applicant: SAMSUNG DISPLAY CO., LTD., Yongin, Gyeonggi-Do (KR)

(72) Inventors: Seiki Takahashi, Yokohama (JP); Masahiko Yoshiyama, Yokohama (JP)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 169 days.

(21) Appl. No.: 14/107,877

(22) Filed: Dec. 16, 2013

(65) Prior Publication Data

US 2014/0168285 A1 Jun. 19, 2014

(30) Foreign Application Priority Data

Dec. 17, 2012 (JP) ................................ 2012-274550

(51) Int. Cl.

*G06K 9/00* (2006.01)
*G09G 5/02* (2006.01)
*G09G 5/10* (2006.01)

(52) U.S. Cl.

CPC .............. *G09G 5/02* (2013.01); *G09G 2340/06* (2013.01)

(58) Field of Classification Search

CPC .................................. G06K 9/00; H04N 1/00
USPC .......... 382/162-167, 228, 276; 345/589-593, 345/597, 604, 690
See application file for complete search history.

(56) References Cited

U.S. PATENT DOCUMENTS 7,956,823 B2 * 6/2011 Miyachi ............... G09G 3/3607 345/690

FOREIGN PATENT DOCUMENTS

| | | | |
|---|---|---|---|
| JP | 2006-013836 | A | 1/2006 |
| JP | 2007-174216 | A | 7/2007 |
| JP | 2009-218961 | A | 9/2009 |
| JP | 2010-183232 | A | 8/2010 |
| JP | 2010-245709 | A | 10/2010 |
| WO | WO 2005/112428 | A1 | 11/2005 |

* cited by examiner

*Primary Examiner* — Abolfazl Tabatabai
(74) *Attorney, Agent, or Firm* — Lee & Morse, P.C.

(57) ABSTRACT

An image processor includes a input converter converting an input image into linear first image data of a first color gamut; a color gamut converter converting first image data into second image data expressing a second color gamut narrower than the first color gamut; a blend coefficient selector selecting a first blend coefficient when hue and saturation belong to a first color domain range, a second blend coefficient, having a reduced synthesis ratio of second image data compared with the first blend coefficient, when hue and saturation belong to a second color domain range, and a third blend coefficient, between the first and second blend coefficients, when hue and saturation belong to a color domain between the first color domain range and the second color domain range; and a color synthesis unit synthesizing first image data and second image data according to the decided blend coefficient.

9 Claims, 3 Drawing Sheets

IMAGE PROCESSING DEVICE, IMAGE PROCESSING METHOD AND PROGRAM

CROSS-REFERENCE TO RELATED APPLICATION

Japanese Patent Application No. 2012-274550, filed on Dec. 17, 2012, in the Japanese Intellectual Property Office, and entitled: "Image Processing Device, Image Processing Method, and Program," is incorporated by reference herein in its entirety.

BACKGROUND

1. Field

Embodiments relate to an image processing technique capable of converting a color gamut.

2. Description of the Related Art

A color reproduction domain of a display may be enlarged according to improvement of a color display technology. In particular, as compared with the general RGB standards, a liquid crystal monitor using an LED backlight, an organic EL display, etc., may realize a wider color reproduction domain. In the event that a signal corresponding to a narrow color gamut is provided to a wide color gamut display, a technique of converting a color gamut from a narrow color gamut to a wide color gamut may become important for good expression.

For example, in the event that a display having an Adobe® RGB color space displays an image having a sRGB color space without modification, such an image may be expressed as clearly changed color formation. This problem may be generated mismatch of color gamut used. This phenomenon may be caused when image data made up using a narrow color gamut is displayed by a wide color gamut display.

SUMMARY

One or more embodiments is directed to providing an image processing device which comprises a signal input unit which converts an input signal indicating an image into a first image data of a first color gamut, the first image data being linear; a color gamut conversion unit which converts the first image data into second image data for expressing a second color gamut narrower than the first color gamut; a blend coefficient deciding unit which decides a blend coefficient for defining a synthesis ratio of the first image data and the second image data based on a hue and a saturation obtained from the input signal; and a color synthesis unit which synthesizes the first image data and the second image data by a ratio according to the decided blend coefficient to generate synthesis image data, wherein the blend coefficient deciding unit decides the first blend coefficient when the hue and the saturation belong to a first color domain range, wherein the blend coefficient deciding unit decides the second blend coefficient by which a synthesis ratio of the second image data is reduced in comparison with the first blend coefficient, when the hue and the saturation belong to a second color domain range different from the first color domain range, and wherein the blend coefficient deciding unit decides a third blend coefficient, between the first blend coefficient and the second blend coefficient, when the hue and the saturation belong to a color domain between the first color domain range and the second color domain range.

The first blend coefficient may be decided such that the synthesis image data becomes the second image data.

The second blend coefficient may be decided such that the synthesis image data becomes the first image data.

The blend coefficient deciding unit may decide the third blend coefficient according to the hue and saturation.

When the hue and the saturation vary from the first color domain range to the second color domain, the blend coefficient deciding unit may decide the third blend coefficient that continuously varies from the first blend coefficient to the second blend coefficient.

Given hue is H and saturation is S, the first color domain range satisfies conditions of $0° \le H \le 50°$ and $S \le S1$ (S1 being a value more than 0.6 and less than 0.75), and the second color domain range satisfies conditions of $70° \le H \le 240°$ or $S \le S2$ (S2 being a value more than 0.8 and less than 0.95).

One or more embodiments is directed to providing an image processing method which comprises converting an input signal indicating an image into a first image data of a first color gamut, the first image data being linear; converting the first image data into second image data for expressing a second color gamut narrower than the first color gamut; deciding a blend coefficient for defining a synthesis ratio of the first image data and the second image data based on a hue and a saturation obtained from the input signal; and synthesizing the first image data and the second image data by a ratio according to the decided blend coefficient to generate synthesis image data. The deciding a blend coefficient comprises deciding the first blend coefficient when the hue and the saturation belong to a first color domain range; deciding the second blend coefficient by which a synthesis ratio of the second image data is reduced in comparison with the first blend coefficient, when the hue and the saturation belong to a second color domain range different from the first color domain range, and deciding a third blend coefficient, between the first blend coefficient and the second blend coefficient, when the hue and the saturation belong to a color domain between the first color domain range and the second color domain range.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
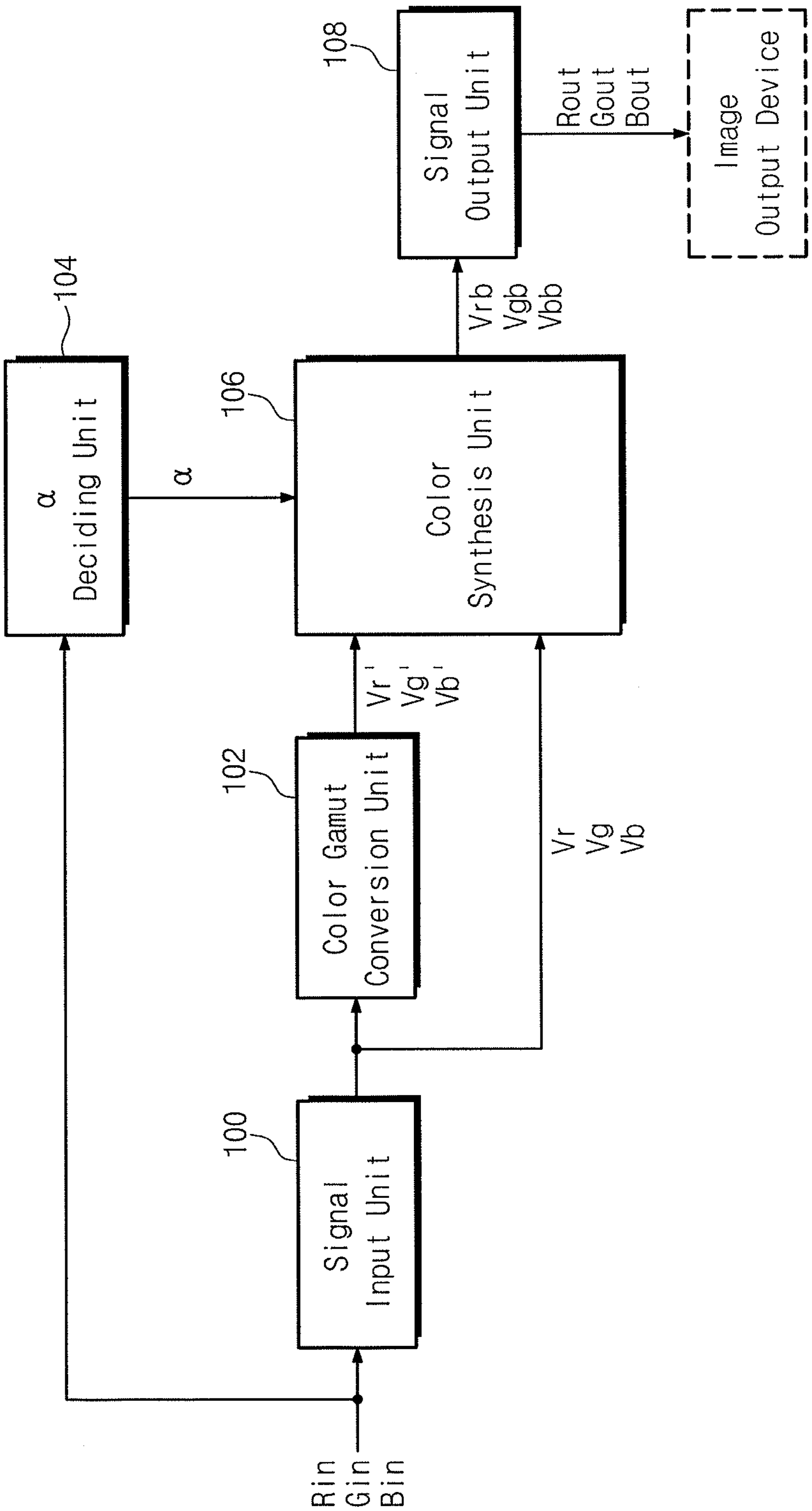
FIG. 1 illustrates a block diagram of an image processing device according to an embodiment.

Example embodiments will now be described more fully hereinafter with reference to the accompanying drawings; however, they may be embodied in different forms and should not be construed as limited to the embodiments set forth herein. Rather, these embodiments are provided as examples so that this disclosure will be thorough and complete, and will fully convey the concept of the disclosure to those skilled in the art. Accordingly, known processes, elements, and techniques are not described with respect to some of the embodiments. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 illustrates a block diagram of a signal output unit according to an embodiment. An image processing device may include a signal input unit 100, a color gamut conversion unit 102, a blend coefficient setting unit (a deciding unit) 104, a color synthesis unit 106, and a signal output unit 108.

The signal input unit 100 may receive a signal (e.g., input signals Rin, Gin, and Bin) indicating an image. The signal input unit 100 may standardize or normalize the input signals Rin, Gin, and Bin to be between 0 and 1. The signal input unit 100 may perform power conversion on the standardized signals to generate linear image data Vr, Vg, and Vb. For example, in the event that an input signal has the sRGB standard, a gamma ($\gamma$) value may be 2.2. Thus, the linear image data Vr, Vg, and Vb may be generated through a power of 2.2.

The color gamut conversion unit 102 may convert the image data Vr, Vg, and Vb generated by the signal input unit 100 into image data for narrow color gamut expression in a wider color gamut display using a conversion matrix. For example, a sRGB color gamut may be expressed through an Adobe RGB color gamut display. However, embodiments are not limited thereto. The color gamut conversion unit 102 may perform calculation for narrow color gamut expression in a wide color gamut display using a conversion matrix. That is, the color gamut conversion unit 102 may convert image data generated by the signal input unit 100 into image data for expressing a color gamut narrower than that of the image data. The color gamut conversion unit 102 may generate image data Vr', Vg', and Vb' as a conversion result.

The blend coefficient deciding unit 104 may decide a blend coefficient $\alpha$ based on a Hue H and a saturation S obtained from input signals Rin, Gin, and Bin. The blend coefficient $\alpha$ may define a synthesis ratio of image data Vr, Vg, and Vb and image data Vr', Vg', and Vb' synthesized by the color synthesis unit 106. For example, in the synthesis ratio, if the blend coefficient $\alpha$ is 1, the image data Vr', Vg', and Vb' may be 100%. If the blend coefficient $\alpha$ is 0, the image data Vr, Vg, and Vb may be 100%. When a hue H and a saturation S obtained from the input signals Rin, Gin, and Bin belong to a skin color domain corresponding to a skin color, the blend coefficient deciding unit 104 may decide the blend coefficient $\alpha$ as 1. When other color domains (e.g., color domains not including a skin color domain), the blend coefficient deciding unit 104 may decide the blend coefficient $\alpha$ as a value less 1, for example, 0. When a color domain is between the skin color domain and the other color domains, the blend coefficient deciding unit 104 may decide the blend coefficient $\alpha$ according to a hue H and a saturation S obtained from the input signals Rin, Gin, and Bin. For example, when the hue H and the saturation S obtained from the input signals Rin, Gin, and Bin vary from the skin color domain to the other color domain, the blend coefficient $\alpha$ may be decided to be continuously varied.

The color synthesis unit 106 may synthesize the image data Vr, Vg, and Vb generated by the signal input unit 100 and the image data Vr', Vg', and Vb' generated by the color gamut conversion unit 102 using a synthesis ratio according to the blend coefficient $\alpha$ decided by the blend coefficient deciding unit 104. If the color sense (e.g., a skin color) is changed, synthesis may be made such that a color giving sense of incongruity to a viewer is expressed based on a narrow color gamut as far as possible, such that the remaining domain other than the color domain of the skin color is expressed based on a wide color gamut. The color synthesis unit 106 may generate synthesized image data Vrb, Vgb, and Vbb.

The signal output unit 108 may perform power conversion on image signals Vrb, Vgb, and Vbb after synthesis to generate output signals Rout, Gout, and Bout. For example, Rout, Gout, and Bout having the number of bits required may be generated through a power of 1/2.2. The output signals Rout, Gout, and Bout may be output to an image output device, e.g., display, a projector, a printer, etc.

With the image processing device including the blend coefficient deciding unit 104, although image data of a narrow color gamut is output to a device having a wide color gamut, an image may be expressed with a natural tone. Below, this image processing method will be more fully described.

First, after standardizing input signals Rin, Gin, and Bin to be between 0 to 1, Vr, Vg, and Vb may be calculated by power conversion of $\gamma$=2.2, and may be expressed by the following equation (1) in case of 8-bit.

$$\begin{pmatrix} vr \\ vg \\ vb \end{pmatrix} = \begin{pmatrix} (Rin/255)^{\gamma} \\ (Gin/255)^{\gamma} \\ (Bin/255)^{\gamma} \end{pmatrix} \tag{1}$$

Since gamma ($\gamma$) of sRGB is 2.2, image data Vr, Vg, and Vb may have linear values by dividing input RGB image data by a 8-bit level width (e.g., 255) for standardization (e.g., a value between 0.0 and 1.0) and using a power of 2.2.

Then, image data Vr', Vg', and Vb' after color conversion may be calculated from the image data Vr, Vg, and Vb. Here, a conversion matrix [Mc] for narrow color gamut expression of a wide color gamut display may be obtained from the following equations (2) and (3).

$$\begin{pmatrix} X \\ Y \\ Z \end{pmatrix} = [Mnc]\begin{pmatrix} Vr \\ Vg \\ Vb \end{pmatrix} = [Mwc]\begin{pmatrix} Vr' \\ Vg' \\ Vb' \end{pmatrix} \quad (2)$$

$$\begin{pmatrix} Vr' \\ Vg' \\ Vb' \end{pmatrix} = [Mwc]^{-1}[Mnc]\begin{pmatrix} Vr \\ Vg \\ Vb \end{pmatrix} = [Mc]\begin{pmatrix} Vr \\ Vg \\ Vb \end{pmatrix} \quad (3)$$

Here, [Mnc] indicates a conversion matrix of a narrow color gamut and [Mwc] indicates a conversion matrix of a wide color gamut. [Mc]=[Mwc]−1[Mnc].

Figure 2:
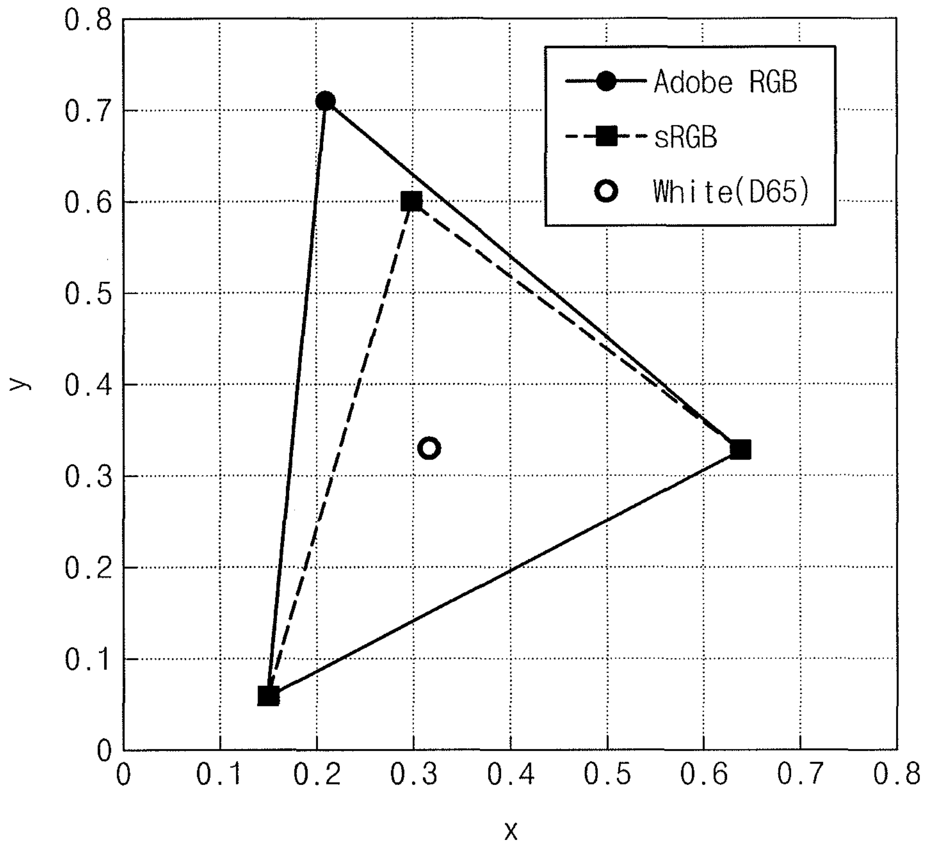
FIG. 2 illustrates a graph showing a color gamut difference of Adobe RGB and sRGB.

For example, assume that a wide color gamut is Adobe RGB and a narrow color gamut is sRGB. The following table 1 indicates CIE xy coordinate values of Adobe RGB and sRGB. A result obtained by plotting them by a CIE xy chromaticity diagram is illustrated in FIG. 2. Here, white may be the same D65. As understood from the FIG. 2, a color gamut of Adobe RGB may be wider than that of sRGB. In particular, green of RGB may be widely expressed.

TABLE 1

| | sRGB | | Adobe RGB | |
|---|---|---|---|---|
| | x | y | x | y |
| R | 0.640 | 0.330 | 0.640 | 0.330 |
| G | 0.300 | 0.600 | 0.210 | 0.710 |
| B | 0.150 | 0.060 | 0.150 | 0.060 |
| W | 0.3127 | 0.329 | 0.3127 | 0.329 |

Also, the following table 2 to 4 may show conversion matrixes of Adobe RGB and sRGB and [Mc] values of the equation (3).

TABLE 2

| [Mwc]: conversion matrix of Adobe RGB | | |
|---|---|---|
| 0.5767 | 0.1856 | 0.1882 |
| 0.2973 | 0.6274 | 0.0753 |
| 0.0270 | 0.0707 | 0.9913 |

TABLE 3

| [Mnc]: conversion matrix of sRGB | | |
|---|---|---|
| 0.4124 | 0.3576 | 0.1805 |
| 0.2126 | 0.7152 | 0.0722 |
| 0.0193 | 0.1192 | 0.9505 |

TABLE 4

| $[Mnc] = [Mwc]^{-1}$ [Mnc] | | |
|---|---|---|
| 0.7151 | 0.2849 | 0.0000 |
| 0.0000 | 1.0000 | 0.0000 |
| 0.0000 | 0.0412 | 0.9588 |

Synthesis image data Vrb, Vgb, and Vbb may be generated by blending the obtained image data Vr, Vg, and Vb and the obtained image data Vr', Vg', and Vb' using a blend coefficient α. The synthesis image data Vrb, Vgb, and Vbb may be obtained from the following equations (4) to (6). The blend coefficient α will be more fully described later.

$$Vrb=(1-\alpha)Vr+\alpha Vr' \quad (4)$$

$$Vgb=(1-\alpha)Vg+\alpha Vg' \quad (5)$$

$$Vbb=(1-\alpha)Vb+\alpha Vb' \quad (6)$$

The synthesis image data Vrb, Vgb, and Vbb may be converted into output signals Rout, Gout, and Bout according a required bit number through power conversion. For example, the output signals Rout, Gout, and Bout according a required bit number may be generated using a power of 2.2. The following equation (7) may show an 8-bit case.

$$\begin{pmatrix} Rout \\ Gout \\ Bout \end{pmatrix} = \begin{pmatrix} 255(Vrb)^{1/\gamma} \\ 255(Vgb)^{1/\gamma} \\ 255(Vbb)^{1/\gamma} \end{pmatrix} \quad (7)$$

The blend coefficient α may be decided based on a hue H and a saturation S obtained from input signals Rin, Gin, and Bin. A skin color domain and other color domains (e.g., color domains not including a skin color domain) may be decided from a range of a hue H and a saturation S, respectively. When a hue H and a saturation S obtained from the input signals Rin, Gin, and Bin belong to the skin color domain or in case of the other color domains, the blend coefficient α may be fixed. In a color domain between the skin color domain and the other color domains, the blend coefficient α may be decided to be continuously changed. The hue H and the saturation S of the skin color domain and the other color domains may be as follows.

skin color domain $$0°\le H\le 50° \text{ and } S\le S1(S1=0.6\sim0.75)$$

blend coefficient (α)=1(narrow color gamut expression)

other color domains $$70°\le H\le 340° \text{ or } S\ge S2(S2=0.8\sim0.95)$$

blend coefficient (α)=0(wide color gamut expression)

'S1' may be a value of S deciding a skin color domain, 'S2' may be a value of S deciding other color domains, and 'S1' and 'S2' may have different values. That is, 'S2' may have a value less than 1, and 'S1' may have a value less than 'S2'. That 'S1' and 'S2' have values out of a range may not be desirable. That is, that 'S1' and 'S2' are set to approximate values may be desirable. The skin color domain and the other color domains may be accurately decided by defining hue and saturation ranges as described above. S1 and S2 values may be appropriately decided. That such values are set to be large may mean that color transformation into a narrow color gamut becomes strong.

Also, the skin color domain and the other color domains may not be limited to this disclosure. For example, in case of a range recognized as a skin color domain considering a hue H, a saturation S, and a value V, such domains may be appropriately decided by an implementation.

When a blend coefficient α of the skin color domain is 1, a blend coefficient α of other color domains may be set to a value less than 1. In particular, a blend coefficient α of other color domains may be a constant value less than 1, e.g., 0. As a blend coefficient is decided as described above, the skin color domain may be expressed based on a narrow color gamut, and the other color domains may be expressed based on a wide color gamut.

A hue H, a saturation S, and a value V from RGB data of an input signal may be obtained by the following equations (8) to (10).

$$H = 60\frac{G - B}{\text{Max} - \text{Min}} \quad \text{if Max} = R \text{ or}$$
$$H = 60\frac{B - R}{\text{Max} - \text{Min}} + 120 \quad \text{if Max} = G \text{ or}$$
$$H = 60\frac{R - G}{\text{Max} - \text{Min}} + 240 \quad \text{if Max} = B \tag{8}$$

$$S = \frac{\text{Max} - \text{Min}}{\text{Max}} \tag{9}$$

$$V = \text{Max} \tag{10}$$

For example, when sRGB image data is expressed by Adobe RGB, for expression without giving sense of incongruity to a viewer, S1 may be decided to be more than 0.6 and less than 0.75, and S2 may be decided to be more than 0.8 and less than 0.95. For example, when S1 is 0.6, S2 may be set to 0.8 (when a blend coefficient α is 0.5 S is 0.7). Alternatively, when S1 is 0.75, S2 may be set to 0.95 (when a blend coefficient α is 0.5 S is 0.85). More particularly, when converting from sRGB to Adobe RGB, S1 may be set to 0.75 and S2 may be set to 0.95.

The blend coefficient α may be set to 1 when a value S deciding a saturation is less than S1 and to a constant value less than 1 when the value S deciding a saturation is more than S2 (e.g., α=0). Since S1 and S2 are set to different values, the blend coefficient α on a color domain between 51 and S2 may be decided to be continuously changed. For example, the blend coefficient α on a domain where a value S is more than S1 and less than S2 may be decided by the following equation (11).

$$\alpha = \frac{S2 - S}{S2 - S1} \tag{11}$$

Figure 3:
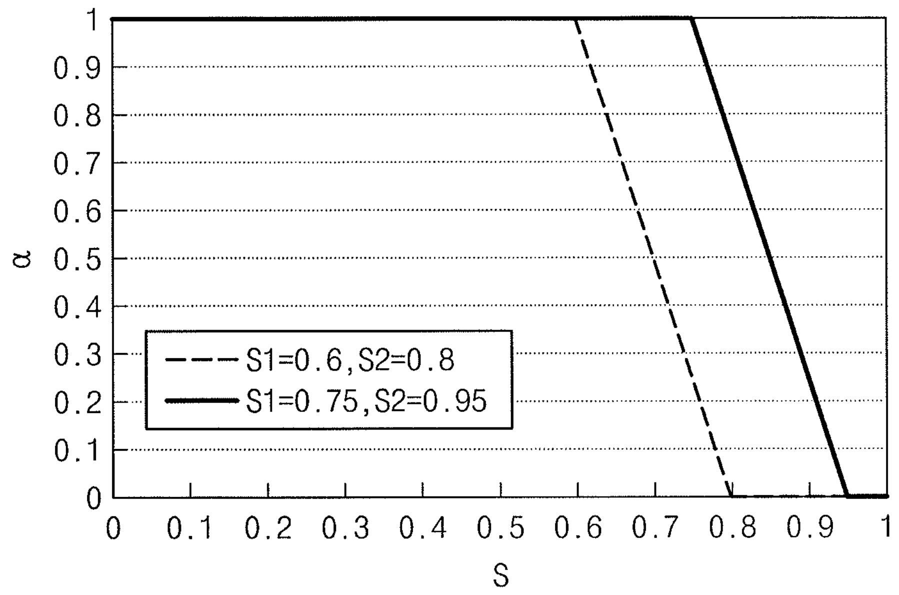
FIG. 3 illustrates a graph indicating a relation between a saturation S and a blend coefficient $\alpha$ in case of $0° \le H \le 50°$.

FIG. 3 illustrates a graph indicating a relation between a saturation S and a blend coefficient α in case of $0° \le H \le 50°$. Referring to FIG. 3, a graph may show such a case that expression is made according to a narrow color gamut when a blend coefficient α is 1 and according to a wide color gamut when a blend coefficient α is 0. When S1 is set to 0.6 and S2 is set to 0.8 or when S1 is set to 0.75 and S2 is set to 0.95, the blend coefficient α may be continuously varied between S1 and S2.

Figure 4:
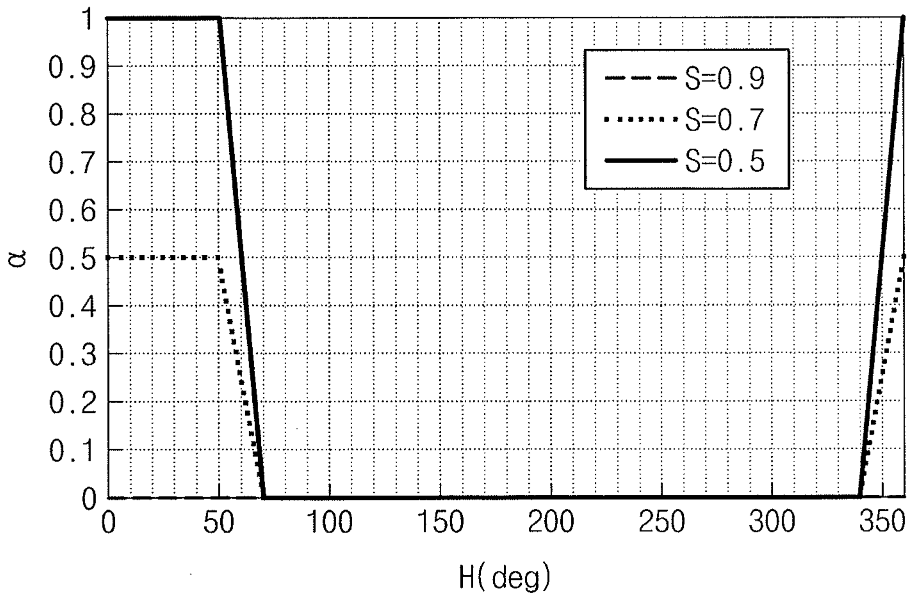
FIG. 4 illustrates a blend coefficient $\alpha$ on a hue H.

FIG. 4 illustrates a blend coefficient α on a hue H. Blend coefficients α of a skin color domain and other color domains may have a constant value, but a blend coefficient α on a color domain between the skin color domain and the other color domains may be set to be continuously varied according to a value of a hue H. As the blend coefficient α on a color domain between the skin color domain and the other color domains is continuously varied, a synthesis ratio of a corresponding domain may be continuously varied.

For example, considering a relation with a hue H, the blend coefficient α on a color domain between the skin color domain and the other color domains may be determined by the following equations (12) and (13).

$$\alpha = \alpha S\frac{79 - H}{70 - 50} \tag{12}$$

In the equation (12), $50° < H < 70°$.

$$\alpha = \alpha S\frac{H - 340}{360 - 340} \tag{13}$$

In the equation (13), $340° < H < 360°$.

In the equations (12) and (13), αS may be a α value in $0° \le H \le 50°$ at the same S value.

Referring to FIG. 4, in the event that a blend coefficient α has a value more than 0 under the condition that a hue H belongs to a range of $50° < H < 70°$, the blend coefficient α may be continuously varied. Also, the blend coefficient α may be the same in case of a range of $340° < H < 360°$.

By way of summation and review, a conventional color conversion technique that only changes of a chromaticity point of input color data may not be sufficient to reduce a sense of incongruity to a viewer when converting between devise having different color gamuts.

In contrast, in accordance with embodiments, hue and saturation values H and S may be set in order to display a color such as a skin color with a natural tone.

As described above, a blend coefficient deciding method may be implemented by defining a first color domain, e.g., a skin color domain, and other color domains by a range of a hue H and a saturation S and deciding a blend coefficient corresponding to each domain. A blend coefficient deciding method may become clear, and expression of a color proximate to a first color domain, e.g., skin color, may be realized the same as a conventional color gamut. Also, in case of the remaining color gamut other than the first color domain, color expression with high saturation according to a wide color gamut display may be realized.

In particular, in the first, e.g., skin, color domain, as a domain converted into a narrow color gamut is widened, allowing expression of a natural tone of skin color (e.g., having a low value V) (more particular, a negative (dark) portion of a skin color, a color of a sunburnt skin, and a skin color of brown) such that a value of a saturation S becomes large.

Also, as a color domain other than a first, e.g., skin, color domain is perfectly converted into a wide color gamut, color expression with high saturation according to a wide color gamut display with respect to a wide range may be realized.

An image processing method according to an embodiment may be read as a program by a device such as a computer or executed by a central processing unit (CPU) embedded in the device. The program may be stored in a computer readable storage medium, and may be provided through a communication network.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An image processing device, comprising:

a signal input converter that converts an input signal indicating an image into first image data of a first color gamut, the first image data being linear;

a color gamut converter that converts the first image data into second image data for expressing a second color gamut narrower than the first color gamut;

a blend coefficient determiner that decides a blend coefficient for defining a synthesis ratio of the first image data and the second image data based on a hue and a saturation obtained from the input signal; and a color synthesizer that synthesizes the first image data and the second image data by a ratio according to the decided blend coefficient to generate synthesis image data, wherein the blend coefficient determiner decides a first blend coefficient when the hue and the saturation belong to a first color domain range, wherein the blend coefficient determiner decides a second blend coefficient, by which a synthesis ratio of the second image data is reduced in comparison with the first blend coefficient, when the hue and the saturation belong to a second color domain range different from the first color domain range, and wherein the blend coefficient determiner decides a third blend coefficient, between the first blend coefficient and the second blend coefficient, when the hue and the saturation belong to a color domain range between the first color domain range and the second color domain range.

2. The image processing device as claimed in claim 1, wherein the first blend coefficient is decided such that the synthesis image data becomes the second image data.

3. The image processing device as claimed in claim 2, wherein the second blend coefficient is decided such that the synthesis image data becomes the first image data.

4. The image processing device as claimed in claim 1, wherein the blend coefficient determiner decides the third blend coefficient according to the hue and the saturation.

5. The image processing device as claimed in claim 4, wherein, when the hue and the saturation vary from the first color domain range to the second color domain, the blend coefficient determiner decides the third blend coefficient to continuously vary from the first blend coefficient to the second blend coefficient.

6. The image processing device as claimed in claim 1, wherein when the hue is H and the saturation is S, the first color domain range satisfies conditions of $0° \leq H \leq 50°$ and $S \leq S1$ (S1 being a value more than 0.6 and less than 0.75), and the second color domain range satisfies conditions of $70° \leq H \leq 240°$ or $S \leq S2$ (S2 being a value more than 0.8 and less than 0.95).

7. The image processing device as claimed in claim 1, wherein the first color domain range correspond to skin color.

8. An image processing method, comprising:

converting an input signal indicating an image into first image data of a first color gamut, the first image data being linear;

converting the first image data into second image data for expressing a second color gamut narrower than the first color gamut;

deciding a blend coefficient for defining a synthesis ratio of the first image data and the second image data based on a hue and a saturation obtained from the input signal; and synthesizing the first image data and the second image data by a ratio according to the decided blend coefficient to generate synthesis image data, wherein deciding the blend coefficient includes:

deciding a first blend coefficient when the hue and the saturation belong to a first color domain range;

deciding a second blend coefficient, by which a synthesis ratio of the second image data is reduced in comparison with the first blend coefficient, when the hue and the saturation belong to a second color domain range different from the first color domain range, and deciding a third blend coefficient, between the first blend coefficient and the second blend coefficient, when the hue and the saturation belong to a color domain range between the first color domain range and the second color domain range.

9. The method as claimed in claim 7, wherein the first color domain range correspond to skin color.

* * * * *